(12) United States Patent
Fischer et al.

(10) Patent No.: US 7,131,665 B2
(45) Date of Patent: Nov. 7, 2006

(54) ARRANGEMENT FOR THE HOLDING OF A STEERING COLUMN TO A CROSS-MEMBER OF A MOTOR VEHICLE

(75) Inventors: Harald Walter Fischer, Remscheid (DE); Andreas Ecker, Remscheid (DE)

(73) Assignee: Delphi Technologies, Inc., Troy, MI (US)

( * ) Notice: Subject to any disclaimer, the term of this patent is extended or adjusted under 35 U.S.C. 154(b) by 369 days.

(21) Appl. No.: 10/706,001

(22) Filed: Nov. 12, 2003

(65) Prior Publication Data

US 2004/0145170 A1 Jul. 29, 2004

(30) Foreign Application Priority Data

Nov. 19, 2002 (DE) ................ 102 53 959

(51) Int. Cl.
*B62D 1/16* (2006.01)
(52) U.S. Cl. ........................ 280/779; 74/492
(58) Field of Classification Search ........... 280/779; 74/492
See application file for complete search history.

(56) References Cited

U.S. PATENT DOCUMENTS

| 5,127,670 A | * | 7/1992 | Hoblingre et al. | 280/779 |
| 5,584,211 A | * | 12/1996 | Hoblingre | 74/492 |
| 5,819,592 A | * | 10/1998 | Lewandowski et al. | 74/492 |
| 5,876,065 A | * | 3/1999 | Ogura et al. | 280/777 |
| 6,170,873 B1 | * | 1/2001 | Jurik et al. | 280/777 |
| 6,220,630 B1 | * | 4/2001 | Sundholm et al. | 280/777 |
| 6,394,493 B1 | * | 5/2002 | Kieserling et al. | 280/775 |
| 6,517,114 B1 | * | 2/2003 | Scheib et al. | 280/779 |
| 6,648,402 B1 | * | 11/2003 | Scheib et al. | 296/203.02 |
| 2002/0024236 A1 | | 2/2002 | Scheib et al. | |

FOREIGN PATENT DOCUMENTS

| DE | DI19539639 C1 | | 10/1995 |
| DE | 19737036 | * | 3/1999 |
| EP | 0634312 | * | 1/1995 |
| FR | 2841523 | * | 1/2004 |

* cited by examiner

*Primary Examiner*—David R. Dunn
*Assistant Examiner*—George D. Spisich
(74) *Attorney, Agent, or Firm*—Jimmy L. Funke

(57) ABSTRACT

An arrangement for the holding of a steering column to a cross-member of a motor vehicle, in particular for a later screw connection of the steering column and/or of a dashboard holder to the cross-member, includes holding means formed at the steering column and at the cross-member which cooperate in a pre-installation state such that the steering column is held freely suspended at the cross-member.

15 Claims, 4 Drawing Sheets

ARRANGEMENT FOR THE HOLDING OF A STEERING COLUMN TO A CROSS-MEMBER OF A MOTOR VEHICLE

TECHNICAL FIELD

The invention relates to an arrangement for the holding of a steering column to a cross-member of a motor vehicle, in particular for a later screw connection of the steering column and/or of a dashboard holder to the cross-member.

BACKGROUND OF THE INVENTION

On the assembly of a motor vehicle, the steering column of the motor vehicle is usually arranged beneath a cross-member of the motor vehicle and is screwed to it. The cross-member can additionally serve as a carrier for a dashboard holder which sits at the top of the cross-member and is fastened to it. Typically, a screw connection is provided for the fastening of the dashboard holder to the cross-member and simultaneously serves for the fastening of the steering column to the cross-member.

A typical assembly procedure therefore provides for the steering column first to be brought into a relative position with respect to the cross-member required for the screw connection to the cross-member and to be fixed in this position by a separate holding apparatus until, in a later assembly step, the dashboard holder is placed onto the cross-member and the screw connection of the dashboard holder, of the cross-member and of the steering column takes place. Only after the screw connection of the steering column and the cross-member can the holding apparatus again be released from the steering column and be removed.

SUMMARY OF THE INVENTION

It is the underlying object of the invention to simplify the installation of the steering column to the cross-member and in particular to dispense with a separate holding apparatus for the steering column on the attachment of the steering column to the cross-member.

The arrangement in accordance with the invention is in particular characterized in that holding means are formed at the steering column and at the cross-member which cooperate in a pre-installation state such that the steering column is held in a freely suspended manner at the cross-member. It is achieved by the holding means that the steering column is fixed to the cross-member in a relative position with respect to the cross-member which is in particular suitable for a later screw connection to the cross-member. The holding means hold the steering column in this pre-installation position for so long until the screw connection of the cross-member and of the steering column or of the dashboard holder, of the cross-member and of the steering column has taken place. Since the holding means are formed directly at the steering column and at the cross-member, the steering column is suspended freely at the cross-member in the pre-installed state without an additional holding apparatus being necessary. The installation of the steering column to the cross-member or of the steering column and the dashboard holder to the cross-member is thereby simplified and the time effort required for the installation is reduced.

Advantageous embodiments of the invention can be found in the dependent claims, in the description and in the drawing.

In accordance with an embodiment of the invention, the steering column can be hooked to at least one rear holding means, preferably to two rear holding means, of the cross-member and can be hung by a pivotal movement and by a subsequent displacement onto at least one front holding means of the cross-member. The hooking of the steering column to the rear holding means of the cross-member as well as the subsequent pivoting, displacement and hanging of the steering column to the front holding means are motions which can be carried out simply and quickly and by which the steering column can be securely fixed to the cross-member. The installation of the steering column to the cross-member is thereby further simplified. At the same time, the steering column is suspended, in the case of two rear holding means and one front holding means, at three points at the cross-member, whereby a reliable holding of the steering column at the cross-member is ensured in the pre-installation state.

The rear holding means of the steering column can be formed as holding arms which extend substantially parallel to the longitudinal central axis of the steering column in the direction of a rear end of the steering column. The holding arms represent a simple means for the hooking of the steering column to the cross-member and allow a displacement of the steering column for the hooking of the steering column into the front holding means without the holding arms releasing from the rear holding means of the cross-member.

In accordance with a further embodiment of the invention, the holding arms have a latch device for the securing of the steering column to the cross-member and in particular for the securing of the holding arms to rear holding means of the cross-member. It is ensured by the latch device that the steering column is securely held at the rear holding means of the cross-member, in particular during a pivoting and displacement of the steering column.

The holding arms can each have a cut-out at a lower side facing the longitudinal central axis in the region of a rear end and/or have a hook-like projection, in particular a hook-like projection facing in the direction of the steering column. An even more secure connection between the rear holding means of the steering column and the rear holding means of the cross-member is thereby achieved.

In accordance with a further embodiment of the arrangement, the connection of the holding arms to rear holding means of the cross-member has clearance. A pivot capability and a displacement capability of the steering column with an easy motion is thereby achieved for the hanging of the steering column to the front holding means of the cross-member, which further simplifies the installation of the steering column.

The rear holding means of the cross-member can each have an elongate bore for the receiving of a respective holding arm of the steering column, with the bores extending in a direction in which the steering column moves on a screw connection to the cross-member. The bores form simple means for the receiving of the holding arms of the steering column. It is furthermore achieved by the elongate extent of the bores that the steering column can be screwed to the cross-member or to the cross-member and a dashboard holder directly from the pre-installation state.

In accordance with a further embodiment of the invention, the rear holding means of the cross-member are formed in one piece with a support member for the steering column which is fastened to the cross-member. No additional components or steps for the installation of the rear holding means of the cross-member are required by the one-piece formation of the rear holding means with the support member.

The rear holding means of the cross-member can each be provided at a fastening section of the support member for a fastening, in particular for a screw connection, of the steering column to the cross-member and can each form a border of a corner region of the fastening section. This results in a stiffening of the fastening sections by the holding means. Vibrations of the steering column screwed to the fastening sections are reduced by the stiffening of the fastening sections.

A centering pin can be provided at the steering column for the alignment of the steering column with the cross-member and/or with a dashboard holder. This centering pin facilitates the correct screw connection of the steering column and the cross-member or of the steering column, the cross-member and the dashboard holder.

A further subject of the invention is, moreover, a method for the attachment of a steering column to a cross-member of a motor vehicle, in particular for a screw connection of the steering column and/or of a dashboard holder to the cross-member, wherein the steering column is hung at the cross-member by means of holding means formed at the steering column and holding means correspondingly formed at the cross-member such that the steering column is held in a freely suspended manner at the cross-member in a pre-installation state.

As has already been described in connection with the arrangement in accordance with the invention, the method in accordance with the invention facilitates the installation of the steering column to the cross-member. Installation time is saved by the hanging of the steering column to the cross-member, on the one hand, and additional holding apparatuses for the fixing of the steering column to the cross-member can be dispensed with, on the other hand. Furthermore, a correct relative position of the steering column with respect to the cross-member in the pre-installation state is always ensured by the hanging of the steering column to the cross-member, whereby the possibility for a fast and problem-free screw connection of the steering column to the cross-member or of the steering column to the cross-member and to a dashboard holder is ensured.

BRIEF DESCRIPTION OF THE DRAWINGS

The invention will be described purely by way of example in the following with reference to an advantageous embodiment and to the drawing. There are shown.

DESCRIPTION OF THE PREFERRED EMBODIMENT

Figure 1:
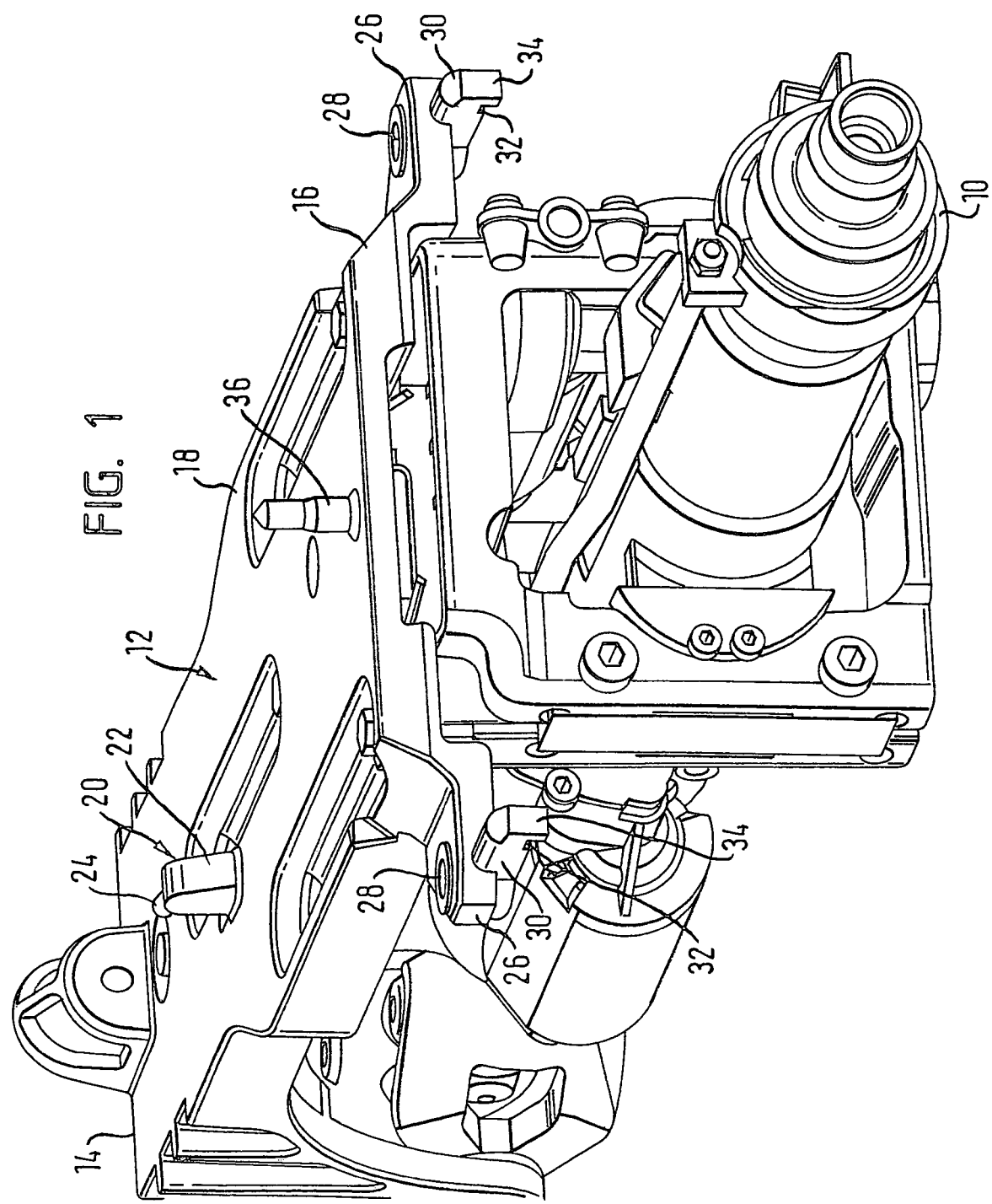
FIG. 1 is a perspective view of a steering column with a steering column holder.

FIG. 1 shows a steering column 10 having a steering column holder 12. The steering column holder 12 has a plate-like base body 18 which extends in a longitudinal direction of the steering column 10. The steering column holder 12 is formed substantially symmetrically with respect to a longitudinal central plane in which a longitudinal central axis of the steering column 10 lies. The steering column holder 12 is arranged at the upper side of the steering column 10 and fixedly connected, for example screwed, to the steering column 10 in each case at a front end 14 and at a rear end 16. The steering column holder 12 can be a cast metal part, for example a magnesium die cast part.

The designations "front" and "back" generally relate to the orientation of a motor vehicle, that is the front end 14 of the steering column holder 12 faces in the direction of the front wheels of the vehicle and the rear end 16 of the steering column holder 12 faces in the direction of a steering wheel to be attached to the steering column 10.

A front holding means 20 of the steering column 10 is formed in a central region of an upper side of the base body 18 of the steering column holder 12 facing away from the steering column 10. The front holding means 20 has a nose-like step 22 projecting from the upper side of the base body 18 of the steering column holder 12. A spigot 24 is formed at the end of the step 22 facing away from the steering column holder 12 and faces in the direction of the front end 14 of the steering column holder 12 and is inclined a little away from the base body 18 of the steering column holder 12. The front holding means 20 is arranged laterally offset next to the longitudinal central plane of the steering column holder 12. It is preferably formed in one piece with the steering column holder 12.

At its rear end 16, the steering column holder 12 has two wing sections 26 which project from the base body 18 of the steering column holder 12 perpendicular to the longitudinal central plane at both sides of the steering column holder 12. A bore 28 is provided in each wing section 26 and extends through the wing section 26 from an upper side of the wing section 26 in a direction perpendicular to the longitudinal axis. As will be explained in more detail below, the wing sections 26 serve for the fastening, and in particular for the screw connection, of the steering column holder 12, and thus of the steering column 10, to a cross-member of the motor vehicle. The wing sections 26 are downwardly offset in the manner of steps, that is in the direction of the steering column 10, with respect to the upper side of the base body 18 of the steering column holder 12.

A holding arm 30 is formed at each wing section 26 and extends from a rear side of the wing section 26 in a direction substantially parallel to the longitudinal central axis of the steering column 10. The holding arms 30 are in turn downwardly offset with respect to the wing sections 26 such that an upper side of the holding arms 30 extends beneath the upper side of the wing sections 26 and the holding arms 30 project over a lower side of the wing sections 26.

The holding arms 30 have in each case a cut-out 32 at their lower sides in the region of their rear ends facing away from the wing sections 26. At the same time, a hook-like projection 34 which faces downwardly, bounds the cut-out 32 and projects over the lower side of the holding arm 30, is provided at the rear end of each holding arm 30. The holding arms 30 are formed in one piece with the steering column holder 12 and form rear holding means for the steering column 10. Their function will be explained in more detail further below.

In the region of the rear end 16 of the steering column holder 12, a centering pin 36 is moreover arranged which projects substantially perpendicular from the upper side of the base body 18 of the steering column holder 12 and is preferably formed in one piece with the steering column holder 12. The centering pin 36 is aligned centered with the steering column 10 and serves for the alignment of the steering column 10 with respect to the cross-member 40.

Figure 2:
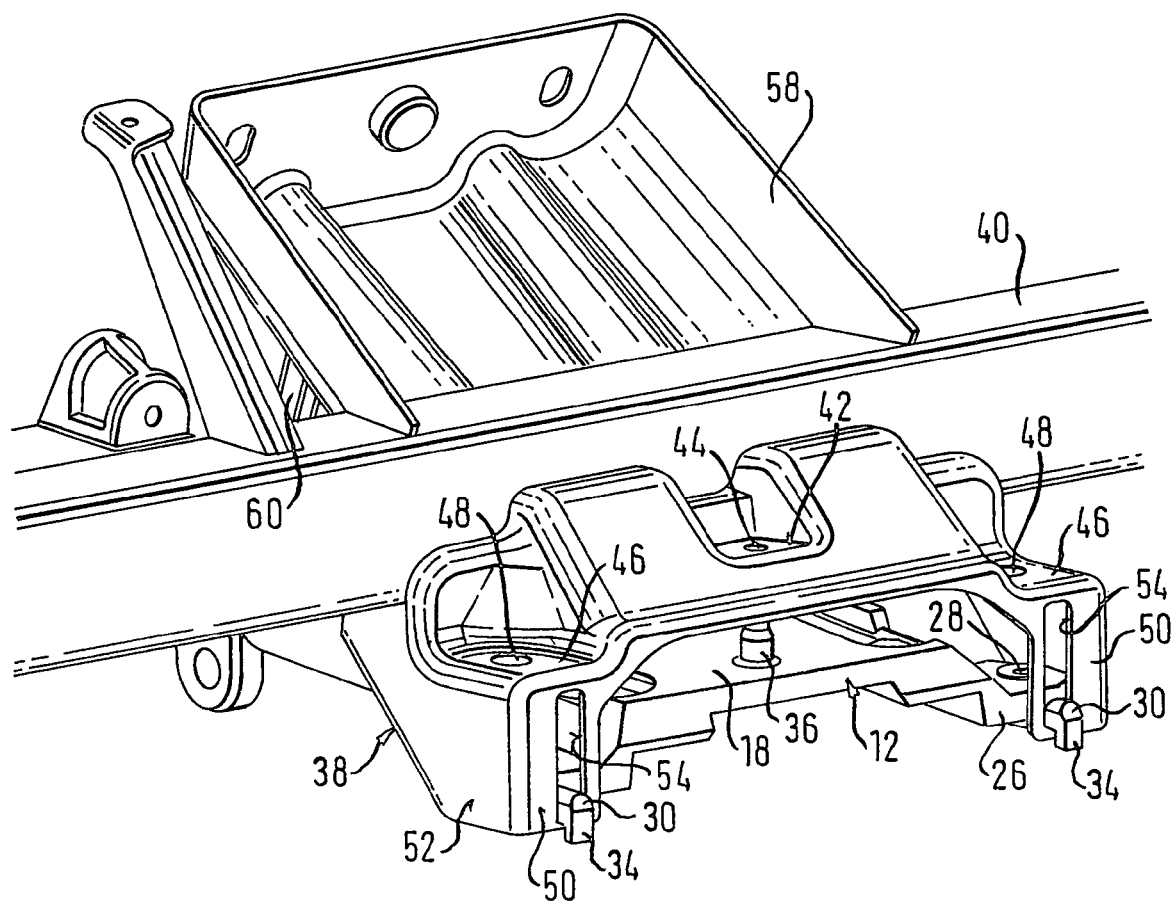
FIG. 2 is a perspective view of the steering column holder of FIG. 1 which is hung at a support member of a cross-member in a pre-installation state.

FIG. 2 shows the steering column holder 12 in a pre-installation state in which the steering column holder 12, and thus the steering column 10, is hung at a support member 38 of the cross-member 40 of a motor vehicle.

The support member 38 is a component which is formed in one piece and which is fixedly connected, for example by a weld connection, to the cross-member 40. The support member 38 extends both rearwardly and downwardly in the direction of the steering column 10 to be supported, starting from the cross-member 40. The support member 38 is substantially matched to the contour of the upper side of the steering column holder 12 in the region of the rear end 16 of the steering column holder 12 for the reception of the steering column holder 12. The support member 38 is formed symmetrically with respect to a plane in which the longitudinal central axis of the steering column 10 to be supported lies.

In a central region, the support member 38 has a planar surface section 42 which is oriented parallel to the upper side of the base body 18 of the installed steering column holder 12. A centering bore 44 is provided in the planar surface section 42 which serves for the receiving of the centering pin 36 and thereby for the centering of the steering column holder 12, and thus of the steering column 10, with respect to the support member and thus to the cross-member 40. The planar surface section 42 extends substantially in a flush manner with a lower side of the cross-member 40 such that the base body 18 of a steering column 12 fixedly screwed to the cross-member 40 contacts the planar surface section 42 and the lower side of the cross-member 40 from below.

In rear side corner regions, the support member 38 in each case has one fastening section 46. The fastening sections 46 each have planar upper and lower sides which are oriented parallel to the planar surface section 42 and to the lower side of the cross-member 40. The fastening sections 46 are arranged beneath the planar surface section 42 and serve as abutments for the wing sections 26 of the installed steering column holder 12. A bore 48 is provided in each fastening section 46, said bore being aligned with the corresponding bore 28 of the steering column holder 12 on the centering of the steering column 10 and of the cross-member 40 and serving for a screw connection of the steering column 10 and the cross-member 40.

A support section 50 which faces downward, that is in the direction of the steering column 10, adjoins a rear rim of each fastening section 46. The support section 50 forms a substantially right angle with the fastening section 46. Furthermore, the support section 50 adjoins a side section 52 which extends at right angles to the support section 50, on the one hand, and is adjacent to a side rim of the fastening section 46 from below, on the other hand. The support section 50 and the side section 52 together form an angular member which stiffens the fastening section 46.

The support sections 50 serve as holding means of the cross-member 40 for the steering column 10. For this purpose, the support sections 50 each have an elongate bore 54 which extends from a lower marginal region of the support sections 50 to an upper marginal region of the support sections 50. The elongate bores 54 are provided for the reception of the holding arms 30 of the steering column holder 12. The elongate bores 54 are dimensioned such that a holder arm 30 inserted into the elongate bore 54 has clearance. The elongate bores 54 accordingly have a somewhat larger width than the holding arms 30. At the same time, they are made so long that the holding arms 30 can move along the elongate bores 54 when the steering column 10 is screwed to the cross-member 40.

As is shown in FIG. 2, the holding arms 30 of the steering column 10 hung at the cross-member 40 in the pre-installation state project from the front to the rear through the elongate bores 54. The holding arms 30 lie on web sections 56 of the support sections 50 which each form a lower bounding of the elongate bores 54. To secure the steering column 10 to the cross-member 40 in this pre-installation state and to prevent the holding arms 30 from releasing from the elongate bores 54, the web sections 56 engage into the cut-outs 32 at the lower side of the holding arms 30. The projections 34 at the ends of the holding arms 30 prevent the holding arms 30 form sliding off the web sections 54. In the pre-installation state, the holding arms 30 thus latch in a defined and fixed relative position of the steering column 10 with respect to the cross-member 40.

Figure 3:
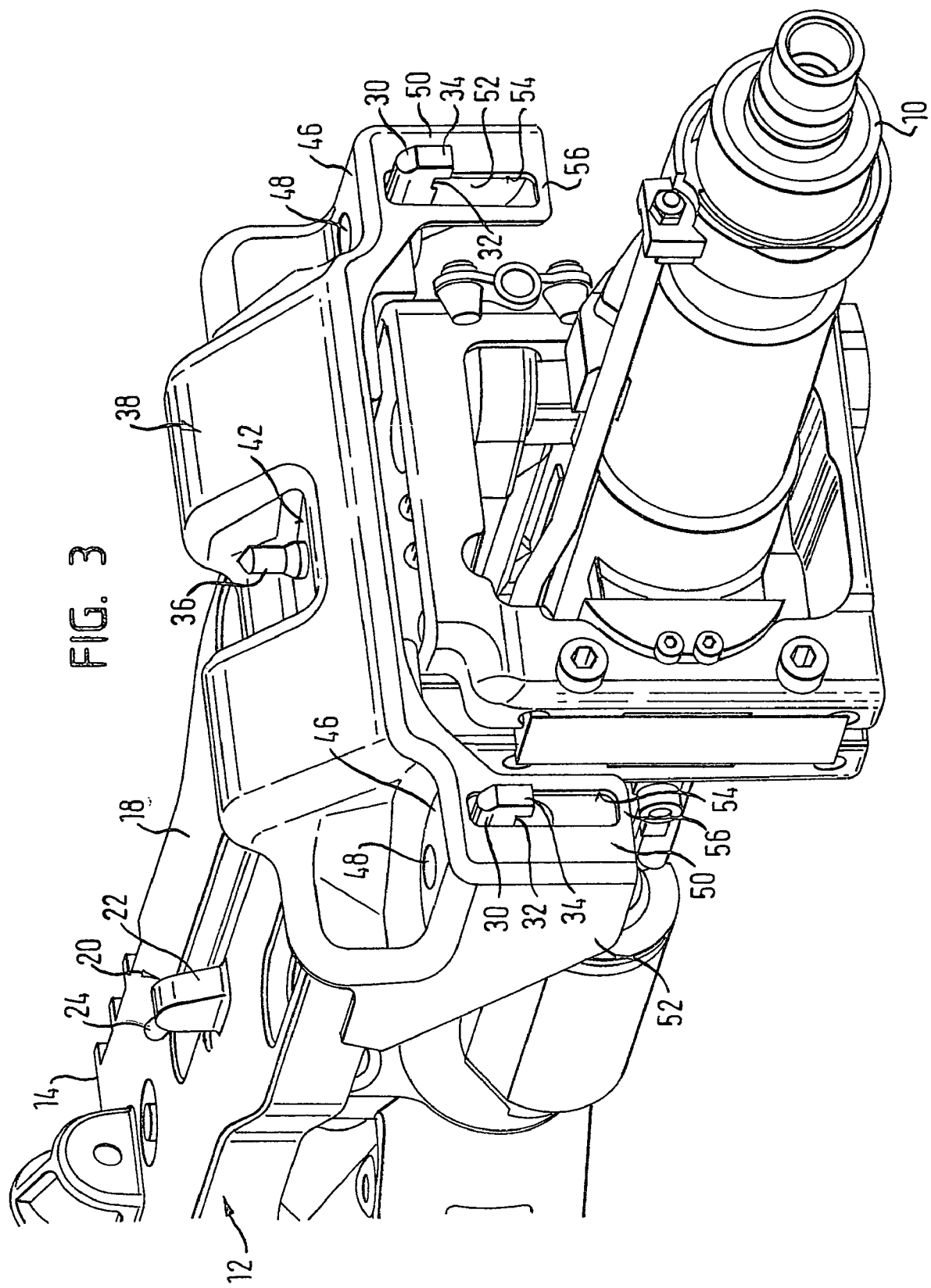
FIG. 3 is a perspective view of the steering column of FIG. 1 in a state screwed to the support member, with the corresponding screws and the cross-member itself not being shown for reasons of clarity.

FIG. 3 represents the support member 38 and the steering column holder 12 in a final state in which the steering column 10 is screwed to the cross-member 40. The screw connection of the steering column holder 12 and of the support member 38 takes place by means of a screw (now shown) which is guided through the bores 48 of the fastening sections 46 of the support member 38 and through the bores 28 of the wing sections 26 of the steering column holder 12. During the tightening of the screw connection, the relative spacing between the steering column holder 12 and the support member 38 reduces and the holding arms 30 move out of the lower region of the elongate bores 54 into the upper region of the bores 54. In the final state shown, the base body 18 of the steering column holder 12 and the wing sections 26 each contact the planar surface section 42 of the support member 38, the lower side of the cross-member 40 and the lower sides of the fastening sections 46. The steering column 10 is fastened to the cross-member 40 in a vibration-free manner due to the additional stiffening of the fastening sections 46 by the support sections 50 and the side sections 52.

During the screwing procedure of the steering column 10 and the cross-member 40, the centering pin 36 of the steering column holder 12 penetrates into the centering bore 44 of the support member 38, whereby a correct alignment of the steering column 10 with respect to the cross-member 40 is ensured. In the end position shown, the centering pin 36 projects upwardly through the centering bore 44. It can in this way simultaneously be used as an adjusting means for a dashboard holder (not shown) to be screwed to the cross-member 40 and to the steering column 10.

Figure 4:
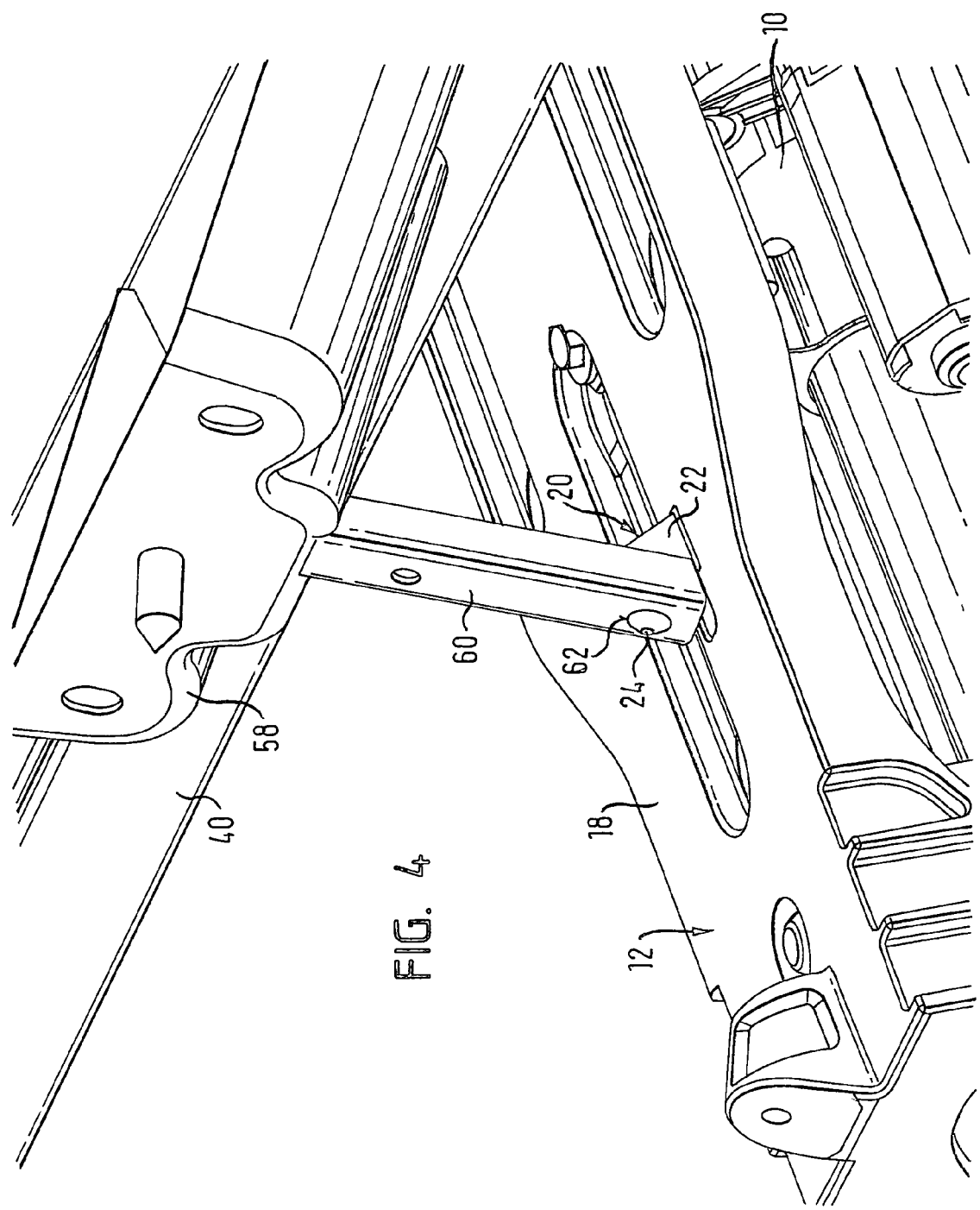
FIG. 4 is a perspective view of a front holding means of the cross-member which is connected to a front holding means of the steering column.

A front suspension of the steering column 10 at the cross-member 40 is shown in FIG. 4. The front holding means 20 of the steering column 10 is, as already mentioned, formed by the step 22 and by the spigot 24 at the upper side of the base body 18 of the steering column holder 12. A support member 58 for a dashboard holder is shaped to the cross-member 40, faces forward and extends obliquely upwardly facing away from the steering column 10. A support arm 60 is formed at a lower side of a front end of the support member 58. The support arm 60 extends downwardly, that is in the direction of the steering column 10, substantially at right angles to the support member 58. A bore 62 for the reception of the spigot 24 of the front holding means 20 of the steering column 10 is provided in a lower end region of the support arm 60. Since the step 22 and the spigot 24 are arranged offset to the side next to the longitudinal central plane of the steering column holder 12, the support arm 60 is also arranged with a corresponding offset at the support member 58 for a correct alignment of the steering column 10.

As can be seen from FIGS. 2 to 4, the steering column 10 is held—both in the pre-installation state and in the screw connection state—at three points to the cross-member 40, namely on the one hand, by the spigot 24 of the steering column holder 12 inserted into the bore 62 of the support arm 60 of the cross arm 40 and, on the other hand, by the two holding arms 30 of the steering column holder 12 inserted into the elongate bores 54 of the support member 38 in the pre-installation state or by the screw connection of the two wing sections 26 of the steering column holder 12 to the fastening sections 46 of the support member 38 in the final state.

The attachment of the steering column 10 to the cross-member 40 takes place as follows:

First, the holding arms 30 of the steering column holder 12 are inserted into the elongate bores 54 of the support member 38 of the cross-member 40 and placed down in a region of the lower side of the holding arms 32 on the web sections 56 of the support sections 50 disposed in front of the cut-outs 32.

Next, the front end of the steering column 10 is pivoted upwardly, with the contact points of the holding arms 30 on the web sections 56 acting as the pivot point. The steering column 10 is pivoted so far until the spigot 24 of the steering column holder 12 is at the height of the bore 62 of the support arm 60.

The spigot 24 is inserted from the rear into the bore 62 of the support arm 60 by a displacement of the steering column 10 in the direction of its front end. The lower web section 56 of the support section 50 latch into the cut-outs 32 of the holding arms 30. The steering column 10 is now held freely suspended at the cross-member 40 by the holding arms 30 inserted into the elongate bores 54 of the support member 38 and by the spigot 24 inserted into the bore 62, without additional holding apparatuses being required for the fixing of the steering column 10 to the cross-member 40. The spigot 24 is secured against slipping out of the bore 62 by the latching of the lower web sections 56 of the support sections 50 into the cut-outs 32 of the holding arms 30. The steering column 10 is thus secured overall to the cross-member.

In a next installation step, a dashboard holder (not shown) can be placed onto the cross-member 40 from above and be positioned in that the steering column is raised so far that the centering pin 36 of the steering column 12 passes through the centering bore 44 of the support member 38 and through a corresponding bore in the dashboard holder.

The dashboard holder can thereafter be screwed together with the cross-member 40 and with the steering column 10. The screw connection is made with the aid of screws which are guided through the bores 28 of the wind sections 26 of the steering column holder 12, through the bores 48 of the fastening sections 46 of the support member 38 and through corresponding bores in the dashboard holder.

During the screwing procedure, the steering column 10 moves so far in the direction of the cross-member 40 until the steering column holder 12 contacts the support member 38 and the cross-member 40. The holding arms 30 of the steering column holder 12 move along the elongate bores 54 of the support member 38. At the same time, the centering pin 36 of the steering column holder 12 passes through the centering bore 14 of the support member 38 and through the corresponding bore in the dashboard holder. This results in a correct alignment of the steering column 10, the cross-member 40 and the dashboard holder. This is achieved when the steering column holder 12 contacts the support member 38 and the cross-member 40 and the centering pin 36 projects both through the centering bore 44 of the support member 38 and through the corresponding bore in the dashboard holder.

The invention claimed is:

1. An arrangement for holding a steering column to a cross-member of a motor vehicle in a pre-installation state, said steering column having a front and a rear, said arrangement comprising
    a front holding means for suspending the front of the steering column; and
    rear holding means for suspending the rear of the steering column,
    said rear holding means including an arm attached to the steering column, and a support section attached to the cross-member having a bore for receiving said arm such that the steering column is hooked to the support section to pivot the steering column about the rear holding means and subsequently displaced toward the front to engage the front holding means to freely suspend the steering column in the pre-installation state.

2. The arrangement in claim 1, wherein the arm extends parallel to a longitudinal central axis of the steering column in a direction toward the rear.

3. The arrangement in claim 1, wherein the arm includes a hook for securing the steering column to the support section.

4. The arrangement in claim 3, wherein the hook includes a projection and a cut-out for securing the steering column to the support section.

5. The arrangement in claim 1, wherein the bore is elongated to allow upward movement of the steering column into a final installation state.

6. The arrangement in claim 1, wherein the rear holding means includes a fastening section for fastening the steering column to the support section of the cross-member by a screw.

7. The arrangement in claim 1, wherein the front holding means comprises
    an arm projecting upwardly from the steering column and comprising a spigot; and
    a support arm attached to the cross-member and having a bore that receives said spigot to engage the front holding means.

8. The arrangement in claim 7, wherein the spigot faces the front of the steering column.

9. The arrangement in claim 1, wherein the steering column further comprises a centering pin, and the cross-member further comprises a bore that engages the centering pin for aligning the steering column to the cross-member.

10. A method for the attachment of a steering column to a cross-member of a motor vehicle, said steering column having a front and a rear, said method comprising
    providing a front holding means for suspending the front of the steering column;
    providing a rear holding means for suspending the rear of the steering column, said rear holding means including an arm attached to the steering column, and a support section attached to the cross-member having a bore;
    inserting said arm into said bore such that the steering column is hooked to the support section;
    pivoting the steering column about the rear holding means;

subsequently displacing the steering column toward the front to engage the front holding means, thereby freely suspending the steering column in a pre-installation state; and installing the steering column to the cross-member.

11. The method of claim 10 further comprising inserting a centering pin on said steering column into a bore in said support to align the steering column with the cross-member.

12. The method of claim 10 further comprising wherein the step of installing the steering column comprises fastening the steering column to the support section of the cross-member.

13. The method of claim 12 further comprising wherein the step of fastening the steering column comprises screwing the steering column to the support section.

14. The method of claim 10 further comprising wherein the bore is elongated, and wherein the step of fastening the steering column comprises upwardly moving the steering column from the pre-installation state to a final installation state.

15. The method of claim 10, wherein the front holding means comprises an arm projecting upwardly from the steering column and comprising a spigot, and a support arm attached to the cross-member and having a bore, and wherein said step of pivoting the steering column comprises pivoting the steering column to position said spigot relative to said bore in said support arm; and wherein the step of displacing the steering column toward said front includes inserting the spigot within the bore in said support arm.

* * * * *